(12) United States Patent
Allard et al.

(10) Patent No.: US 9,476,633 B2
(45) Date of Patent: Oct. 25, 2016

(54) 3D VACUUM PANEL AND A FOLDING APPROACH TO CREATE THE 3D VACUUM PANEL FROM A 2D VACUUM PANEL OF NON-UNIFORM THICKNESS

(71) Applicant: Whirlpool Corporation, Benton Harbor, MI (US)

(72) Inventors: Paul B. Allard, Coloma, MI (US); Andrea Olivani, Cassinetta (IT); Jerry M. Visin, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 14/634,946

(22) Filed: Mar. 2, 2015

(65) Prior Publication Data
US 2016/0258669 A1    Sep. 8, 2016

(51) Int. Cl.
*F25D 23/06* (2006.01)
*F25D 23/02* (2006.01)
*B32B 37/00* (2006.01)
(Continued)

(52) U.S. Cl.
CPC ............... *F25D 23/028* (2013.01); *B32B 3/04* (2013.01); *B32B 3/263* (2013.01); *B32B 37/0076* (2013.01); *B32B 37/18* (2013.01); *B32B 38/0012* (2013.01); *B32B 38/1808* (2013.01); *F25D 23/06* (2013.01); *B32B 2038/0028* (2013.01); *B32B 2307/304* (2013.01); *B32B 2509/10* (2013.01); *B32B 2607/00* (2013.01); *F25D 2201/10* (2013.01)

(58) Field of Classification Search
CPC .... F25D 23/028; F25D 23/06; F25D 23/062; F25D 23/063; F25D 23/065; B32B 3/04; B32B 3/263; B32B 37/0076; B32B 37/18; B32B 38/0012; B32B 38/1808
USPC .............. 312/400, 401, 406; 428/68, 69, 76; 220/592.1, 592.09
See application file for complete search history.

(56) References Cited

U.S. PATENT DOCUMENTS 3,910,658 A * 10/1975 Lindenschmidt ..... F25D 23/062
                                                    220/592.1
3,933,398 A *  1/1976 Haag ..................... F25D 23/062
                                                    220/592.09

(Continued)

FOREIGN PATENT DOCUMENTS

EP         2543942         1/2013
JP      2000320958 A      11/2000

(Continued)

OTHER PUBLICATIONS

PCT International Search Report—Written Opinion dated Apr. 15, 2016, 7 pages. PCT/US 2016/020367.

*Primary Examiner* — James O Hansen

(57) ABSTRACT

A three-dimensional (3D) vacuum insulation panel (VIP) and a folding approach to create the 3D VIP from a two-dimensional (2D) VIP of non-uniform thickness for a refrigerator, a refrigerator freezer or a non-appliance, are disclosed. The folding approach includes placing a VIP main panel and a plurality of VIP wall panels on an outer film, where one or more panels are of a greater thickness than other VIP panels; placing an inner film on top of the VIP main and wall panels and sealing the films together. The inner film is longer than the outer film and this allows the films and the VIP wall panels to be folded into a finished panel, wherein the longer inner film allows for fording without causing tears or micro-cracks in the film that would adversely affect the insulation properties of the three-dimensional (3D) VIP.

16 Claims, 7 Drawing Sheets

(51) Int. Cl.
  *B32B 37/18* (2006.01)
  *B32B 38/18* (2006.01)
  *B32B 38/00* (2006.01)
  *B32B 3/04* (2006.01)
  *B32B 3/26* (2006.01)

(56) References Cited

U.S. PATENT DOCUMENTS 4,006,947 A * 2/1977 Haag ................. B65D 81/3823
  220/592.1
6,109,712 A * 8/2000 Haworth ............. A47L 15/4255
  312/400
2012/0196059 A1 8/2012 Fujimori et al.
2012/0273111 A1 11/2012 Nomura et al.

FOREIGN PATENT DOCUMENTS

| | | |
|---|---|---|
| JP | 2013050267 A | 3/2013 |
| JP | 2013076471 A | 4/2013 |
| RU | 2253792 | 6/2005 |
| WO | 2012044001 | 4/2012 |

* cited by examiner

3D VACUUM PANEL AND A FOLDING APPROACH TO CREATE THE 3D VACUUM PANEL FROM A 2D VACUUM PANEL OF NON-UNIFORM THICKNESS

FIELD OF THE DISCLOSURE

This application relates to a panel or cabinet for refrigeration or non-appliance use, including, but not limited to, an insulated cooler. In particular, the present disclosure relates to a 3D vacuum panel and creating a 3D vacuum panel from a 2D vacuum panel of non-uniform thickness.

BACKGROUND

Various types of insulated cabinet and door insulated structures have been developed for refrigerators, freezers, and other such appliances. Insulated appliance door and cabinet structures may include polyurethane foam, polystyrene or other insulating material that is positioned between an outer door skin or wrapper and an inner door liner. However, known insulated appliance structures may suffer from various drawbacks.

In the related art, vacuum-in-place (VIP) insulation panels are manufactured in a flat 2D shape and are then folded. However, there are drawbacks to this approach. Manufacturing VIP panels in a flat 2D shape limits their application to flat walls and makes it difficult to use as insulation on a surface that is not flat. In some cases, it will be advantageous to have a shape that has some walls that are thicker than others. One solution is to make a 3D core and seal the 3D core in a film having a gas barrier. A drawback to this approach is that it may result in high mechanical stresses in the film that may create tears or holes in the gas barrier which allow air or water vapor to enter the vacuum panel, which can result in air infiltration that defeats the insulation. Thus, there exists a need to overcome these drawbacks in the related art and provide a foldable vacuum insulation panel having sections of different thicknesses.

SUMMARY

An aspect of the present disclosure provides a foldable vacuum insulation panel which consists of sections of different thicknesses. This allows a three-dimensional shape to have walls of different thicknesses after the walls are folded into final form. For example, a French door bottom mount (FDBM) freezer door could be constructed using this method, as could a refrigerator cabinet or a non-appliance. The front wall could be one thickness while the sides could be thicker to match the external metal panel thickness or to include the door dike section. The top piece of the barrier film may be longer than the bottom piece of barrier film in order for it to match the profile of the panel. This would reduce the amount of stretching of the film that would be required to confirm the difference in panel height. Another application of this solution is that the pre-shaped boards are not only different thicknesses, but could also have some three-dimensional features. This would allow, for example, a thicker section to be incorporated to include the door dike or other features that exist in today's polyurethane (PU) foamed doors but would not be possible to incorporate by folding a two-dimensional shape. By having VIP insulation panels that are of different thickness, the VIP insulation panels can replace the PU foamed doors, which is an advantage since the VIP insulation performs better than the PU or polystyrene that would otherwise be used.

An aspect of the present disclosure is generally directed toward a method of manufacturing a 3D VIP insulated door panel from a 2D flat panel of non-uniform thickness, the method including the steps of providing an outer film; providing a flat vacuum-in-place (VIP) main wall on the outer film; providing a VIP top wall on the outer film adjacent to and at an edge of the main wall; providing a VIP bottom wall on the outer film adjacent to the main wall and opposite to the top wall; providing a VIP left wall on the outer film and adjacent to and at an edge of the main wall; providing a VIP right wall on the outer film and adjacent to the main wall and opposite to the left wall, wherein one or more of the VIP top wall, the VIP bottom wall, the VIP left wall and the VIP right wall are thicker than the main wall; providing an inner film on top of the main wall and each of the VIP top wall, VIP bottom wall, VIP left wall and VIP right wall; wherein the inner film is longer than the outer film, sealing the inner and outer films, and providing the inner film in a length wherein folding the VIP top wall, VIP bottom wall, VIP left wall and VIP right wall onto the main wall produces a 3D VIP insulated door panel of non-uniform thickness.

Another aspect of the present disclosure provides a 3D VIP insulated door panel manufactured from a 2D flat panel of non-uniform thickness, 3D VIP insulated door panel including an outer film; a flat vacuum-in-place (VIP) main wall on the outer film; a VIP top wall on the outer film adjacent to and at an edge of the main wall; a VIP bottom wall on the outer film adjacent to the main wall and opposite to the top wall; a VIP left wall on the outer film and adjacent to and at an edge of the main wall; a VIP right wall on the outer film and adjacent to the main wall and opposite to the left wall, wherein one or more of the VIP top wall, the VIP bottom wall, the VIP left wall and the VIP right wall have a different thickness than the main wall; an inner film on top of the main wall and each of the VIP top wall, VIP bottom wall, VIP left wall and VIP right wall; wherein the inner film is longer than the outer film, wherein the inner and outer films are sealed, and the inner film is configured to be of a length wherein folding the VIP top wall, VIP bottom wall, VIP left wall and VIP right wall onto the main wall produces a 3D VIP insulated door panel of non-uniform thickness.

Yet another aspect of the present disclosure provides a refrigerator freezer door assembly, the refrigerator freezer door assembly including a door panel including a door flange on opposite sides of the panel; a top end cap mounted to the top of the door panel between the door flanges; a bottom end cap opposite the top end cap; a folded 3D VIP insulation panel inside the door panel having walls of non-uniform thickness; an inner door liner inside the folded VIP door panel; a gasket surrounding a periphery of the inner door liner; and left and right brackets secured to the inside of the inner door liner.

These and other features, advantages, and objects of the present invention will be further understood and appreciated by those skilled in the art by reference to the following specification, claims, and appended drawings.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown. Drawings are not necessary to scale. Certain features of the invention may be exaggerated in scale or shown in schematic form in the interest of clarity and conciseness.

DETAILED DESCRIPTION OF THE PRESENT DISCLOSURE

Before the subject invention is described further, it is to be understood that the invention is not limited to the particular present disclosure described below, as many variations of the present disclosure may be made and still fall within the scope of the appended claims. It is also to be understood that the terminology employed is for the purpose of describing present disclosure, and is not intended to be limiting in any manner.

In this specification and the appended claims, the singular forms "a," "an" and "the" include plural reference unless the context clearly dictates otherwise. The present disclosure are generally directed toward a 3D vacuum panel and a folding approach to create the 3D vacuum panel from a 2D vacuum panel having a non-uniform thickness.

Figure 1A:
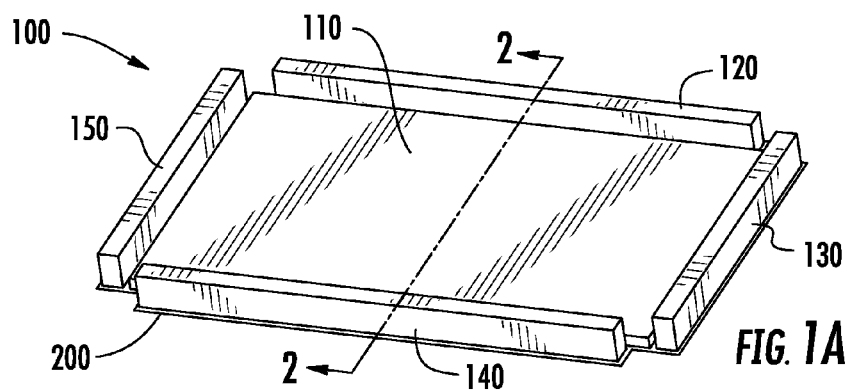
FIG. 1A is a perspective view of an unfolded 3D VIP insulation panel according to an exemplary embodiment.
Figure 1B:
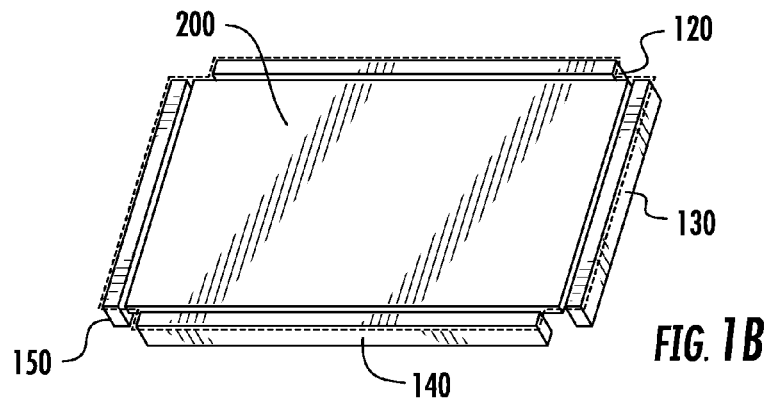
FIG. 1B is a perspective view of the bottom of the unfolded 3D VIP insulation panel of FIG. 1A.
Figure 1C:
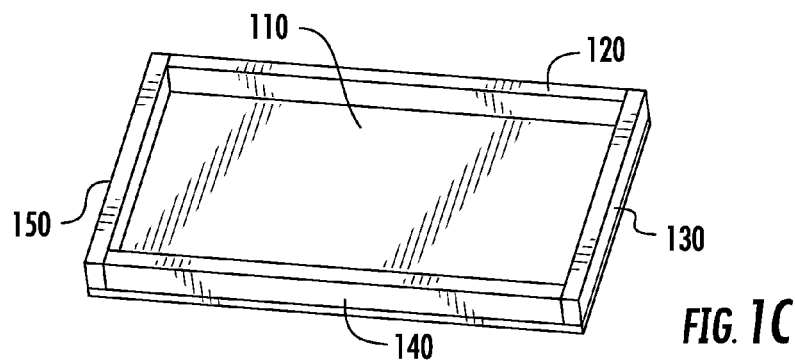
FIG. 1C is a perspective view of the folded 3D VIP insulation panel of FIG. 1A.

For purposes of description herein, The terms "upper," "lower," "right," "left," "rear," "front," "vertical," "horizontal," "top," "bottom," "left," "right" and derivatives thereof shall relate to the disclosure as oriented in FIGS. 1A-1C. However, it is to be understood that the disclosure may assume various alternative orientations, except where expressly specified to the contrary. It is also to be understood that the specific devices and processes illustrated in the attached drawings, and described in the following specification are simply present disclosure of the inventive concepts defined in the appended claims. Hence, specific dimensions and other physical characteristics relating to the present disclosure disclosed herein are not to be considered as limiting, unless the claims expressly state otherwise.

Referring to FIGS. 1A-1C, reference numeral 100 refers to an unfolded main wall and top walls of a vacuum insulation panel (VIP) used in a refrigerator freezer door, but are not limited thereto. The unfolded VIP panel 100 includes main wall 110, top wall 120, right wall 130, and bottom wall 140 which are located opposite to top wall 120, left wall 140 and bottom film 200. In this exemplary embodiment, each of the unfolded walls are adjacent to one another and rest on outer film 200. In addition, the walls, other than the flat main wall 110 are configured to be folded. One or more of the top, bottom, left side and right side VIP walls may be of different thicknesses from each other. Each of the main body 110, and the top, bottom, left and right walls 120-150 rests on a film 200.

FIG. 1B is a rear view of the 3D VIP of FIG. 1A, showing rear film 200 and walls 120, 130, 140 and 150. The main wall 110 is covered by film 200. The walls 110-150 are covered by outer film 200 in this figure.

FIG. 1C is a folded view of a finished 3D VIP. In this aspect of the present disclosure, an inner film 210 has been added on top of walls 110-150 and is sealed to outer film 200 in a conventional manner as would be understood by one of ordinary skill in the art. The walls 120-150 are then folded to form the finished 3D VIP I as shown in FIG. 1C.

Figure 2:
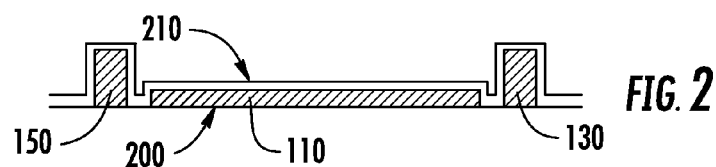
FIG. 2 is a cross-sectional view of FIG. 1A, taken along the lines 2-2 of FIG. 1A.

FIG. 2 is a view which illustrates the inner film 210 placed over the walls 110-150 to be sealed to outer film 200 (only 110, 130 and 150 are shown). The walls 110-150 are then folded, as shown in FIG. 1C, to form the finished 3D VIP for use in a refrigerator freezer assembly. The inner film 210 may be longer than the outer film 200. This permits the walls 120-150 to be folded onto the main wall 110 in such a manner that the longer inner film 210 allows the film to stretch to a point of allowing the product to be finished without tearing or causing micro-cracks, etc., to the film. If there were tears or micro cracks in the film when the seals of the inner and outer films are folded, air could get into the VIP and adversely affect their insulative ability. By making the inner film longer than the outer film, this problem is avoided because the films are not overly stretched to a point of tearing or developing micro-cracks which can adversely affect the insulation properties of the VIP. By making the inner film longer than the outer film, a small gap may be created between the walls of the VIP, which reduces the chance of tears or micro-cracks, and is easier to manufacture. By having the top piece of film longer than the bottom piece of film, the amount of stretching of the film when folding the walls of the VIP is reduced, reducing the chance of tearing or the development of micro-cracks.

Figure 3A:
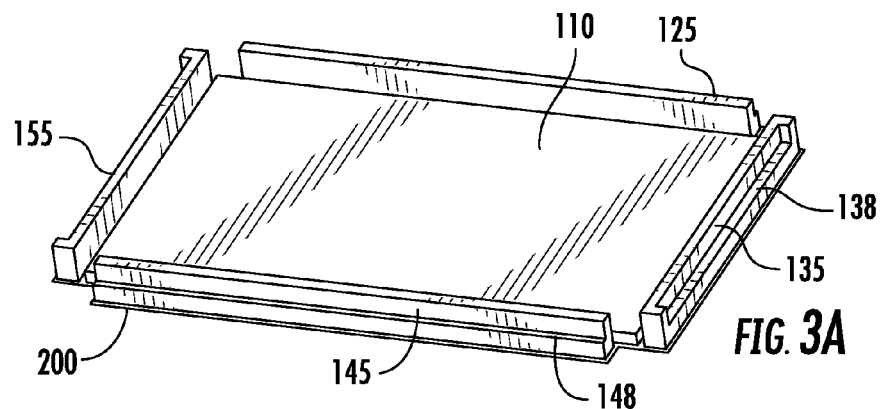
FIG. 3A is a perspective view of an unfolded 3D VIP insulation panel of another exemplary embodiment.

FIG. 3A is a perspective view of an alternate embodiment where the VIP may include sides that are not of uniform cross section and have stepped portions on the walls of the VIP. The stepped portions can be used to mark features of the door so that the door can be thinner in places, resulting in consumers obtaining more space. As shown in FIG. 3A, an unfolded VIP is illustrated. This VIP is similar to FIG. 1A with the exception that the top wall 125, bottom wall 145, left wall 155 and right wall 135 each include a stepped portion. Two stepped portions 138 and 148 are shown. The stepped portions for 125 and 155 are not shown but are the same as stepped portions 138 and 148. The purpose of these stepped portions is to fill a dyke portion of a refrigerator or the dyke portion of a refrigerator freezer.

Figure 3B:
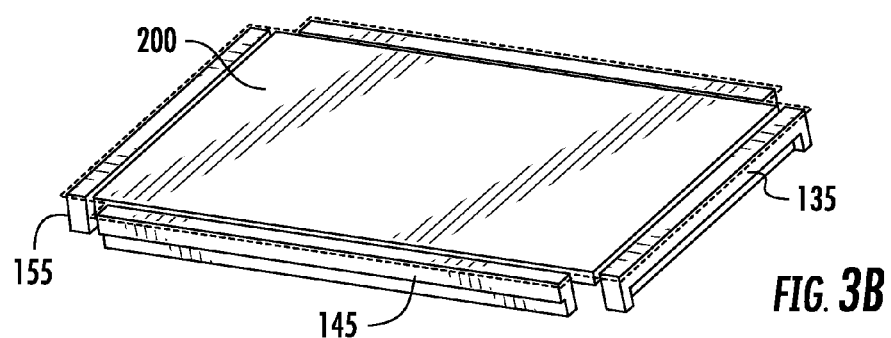
FIG. 3B is a perspective view of the bottom of the unfolded 3D VIP insulation panel of FIG. 3A.

FIG. 3B is a rear perspective view of FIG. 3A. This figure shows film 200 which is located on the underside of main wall 110 and the walls 125, 135, 145 and 155. This figure shows the walls and main wall attached at their undersides to film. Although the film for this exemplary embodiment is shown as being the same size as the film 200 of FIGS. 1A-1C, the size of the film is not limited thereto and may be sized to conform to the size of the main wall 110 and the walls 125, 135, 145 and 155, which are to be folded.

Figure 3C:
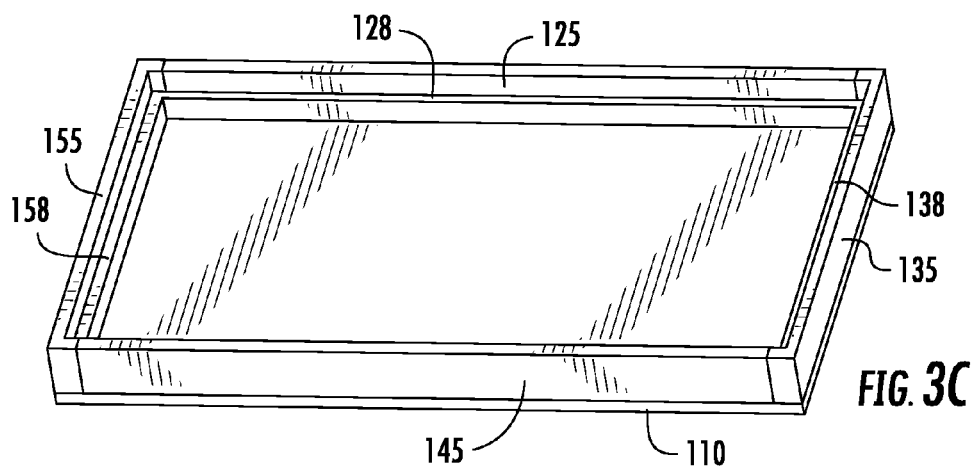
FIG. 3C is a perspective view of the folded 3D VIP insulation panel of FIG. 3A.

FIG. 3C shows a folded VIP. In this embodiment, main wall 110, top wall 125, bottom wall 145, left wall 155 and right wall 135 are all illustrated. In this exemplary embodiment, all of the stepped portions of the walls 125, 135, 145 and 155 are shown to be of the same size and have the same stepped portion. However, the invention is not limited thereto and the walls and stepped portions can be of different sizes and shapes.

Figure 4:
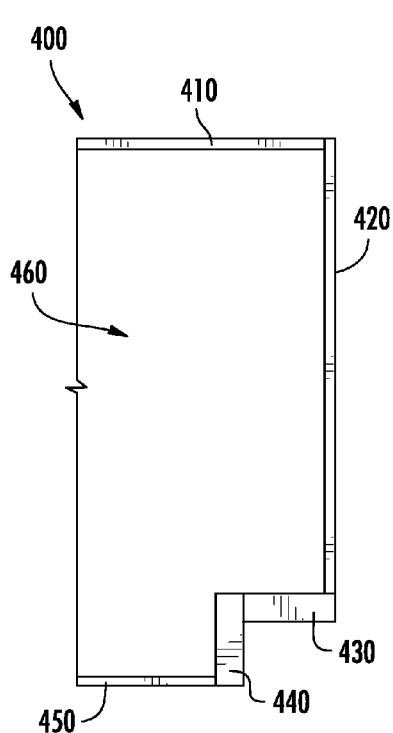
FIG. 4 is a cross sectional view taken along line A-A of FIG. 5 of a folded 3D VIP insulation panel with non-uniform thicknesses according to another exemplary embodiment.
Figure 5:
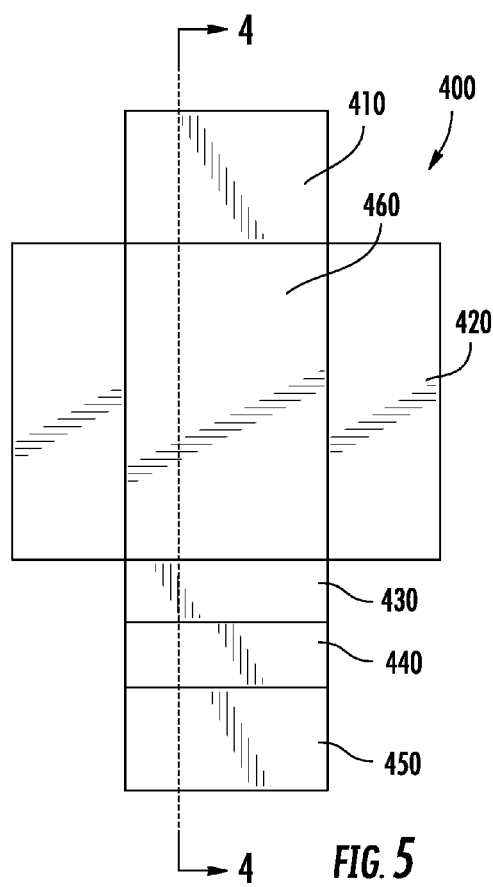
FIG. 5 is an unfolded view of a 2D VIP insulation panel having non-uniform thicknesses.

FIGS. 4 and 5 show an exemplary embodiment having walls of different thicknesses. FIG. 4 is taken along lines 4-4 of FIG. 5. FIG. 4 shows a cutaway of a folded VIP 400. Illustrated is a main wall 460. Top wall 410 and right wall 420 are also shown. Bottom corner walls 430 and 440 are of a greater thickness than top wall 410, bottom wall 450, and right wall 420. Walls 430 and 440 are made thicker in the exemplary embodiment to provide an area of greater insulation to provide better insulation to a compressor, etc.

FIG. 5 is an unfolded blank of a VIP that is folded to make the VIP of FIG. 4. In this exemplary embodiment, thicker walls 430 and 440 are shown to be adjacent to main wall 460. In this exemplary embodiment, films 200 and 210 are not illustrated but may be the same type of films found in the embodiments of FIGS. 1A-1C, FIG. 2 and FIG. 3A-3C.

Figure 6:
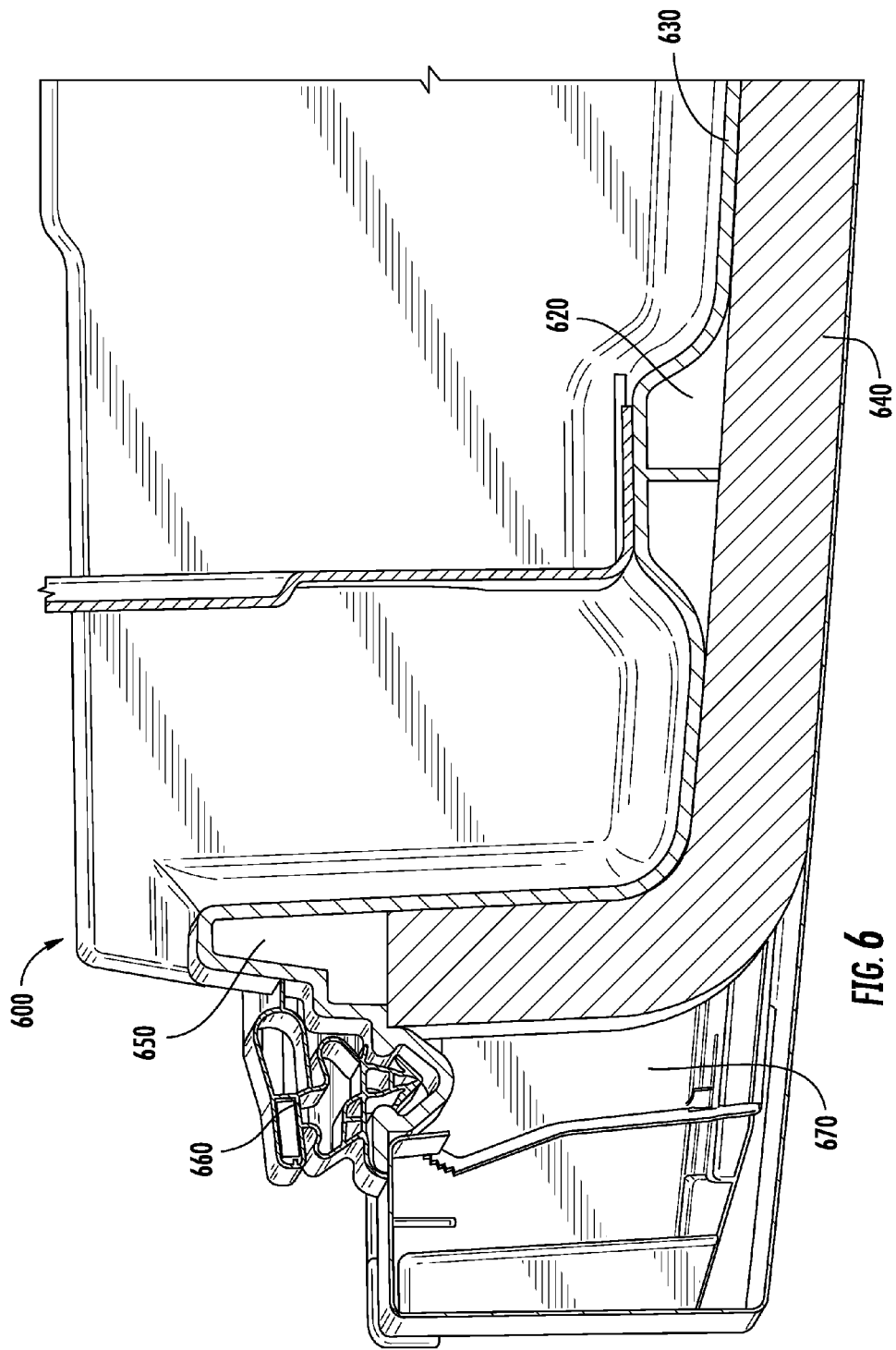
FIG. 6 is a cross sectional view of a refrigerator freezer door having a folded 3D VIP insulation panel according to another exemplary.
Figure 7:
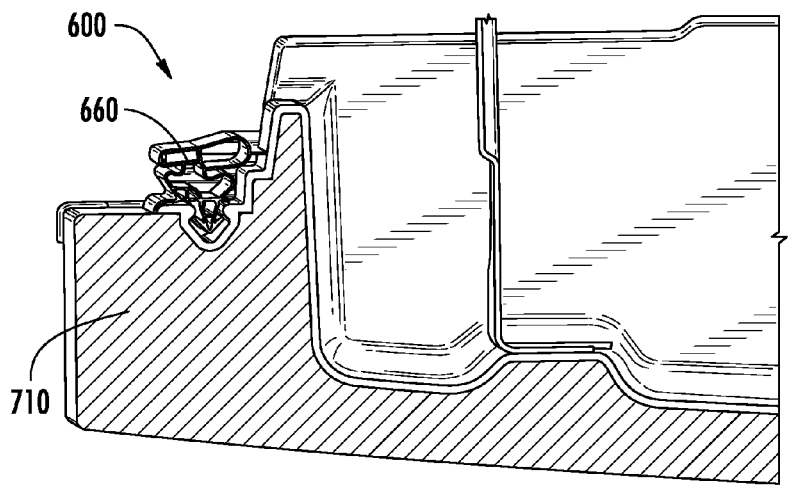
FIG. 7 is a cross sectional view of a refrigerator freezer door having a 3D folded VIP insulation panel according to an exemplary embodiment.

FIG. 6 illustrates an exemplary embodiment of a refrigerator or refrigerator freezer door. In this exemplary embodiment, 620 is an area where a door bracket is attached. Area 620 may be unfilled (air), but may also be filled with an insulation material, including, but not limited to EPS or PU. Reference number 630 is part of a door liner. Reference number 640 is a folded VIP that extends across the door panel 600 and then turns upwardly. As shown, VIP 640 does not extend into the door dyke 650 and does not extend into area 670, which is usually filled with polyurethane (PU) or polystyrene. Gasket assembly 660 is shown in the area usually filled with PU or polystyrene. In this exemplary embodiment, the door dyke 650 may be left empty (air filled) or may be filled with PU or polystyrene, which provide rigidity. A door dyke is the part of the door that goes into the refrigerator and keeps air from getting to the gasket. It is important to keep the cold air away from the gaskets so as to minimize heat transfer through the gasket. FIG. 7 is an illustration of a door panel of a refrigerator or a refrigerator freezer. This exemplary embodiment is similar to the exemplary embodiment of FIG. 6. A difference is that in this exemplary embodiment, the VIP extends across the door liner and upwardly towards the door dyke, represented as 650 in FIG. 6. In this exemplary embodiment, the VIP additionally fills three areas. The first is that the VIP fills the area where a bracket assembly attaches to the inner liner, i.e., the area represented by 620 in FIG. 6. Secondly, the VIP fills the area of the door dyke that would, in the related art, be filled with PU, polystyrene or air. The door dyke is represented by 650 in FIG. 6. The third area is the area 710 where the area would, in the related art, be filled with PU or polystyrene or left empty, i.e., filled with air. A problem with leaving an area filled with air is that if pushed or squeezed, there is no support. During a manufacturing process, the area 710 may be formed similar to a wall 150 in FIG. 2 and folded into place. In this exemplary embodiment, a refrigerator or refrigerator freezer door is illustrated; however, the invention is not limited thereto and the VIP could be formed into the shape of all or part of a refrigerator appliance or a non-appliance, and used as an insulative component to build an entire refrigerator cabinet or a portion of a refrigerator cabinet or a non-appliance including, but limited to an insulated cooler.

Figure 8:
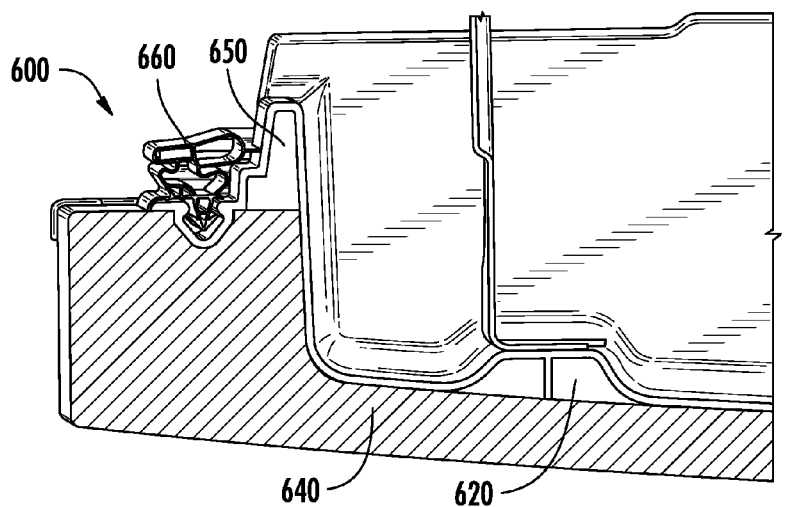
FIG. 8 is a cross sectional view of a refrigerator freezer door having a 3D VIP insulation panel according to another exemplary embodiment.

Turning next to FIG. 8, portion 640 may be filled with a VIP. In this exemplary embodiment, the area of the door dyke 650 is not filled and the area 620 where the bracket assembly meets the inner liner is not filled with a VIP. Rather, these sections not filled with VIP may be filled with PU, polystyrene, or air, but is not limited thereto, as would be understood by one of ordinary skill in the art. In the manufacture of the exemplary embodiment of FIG. 8, the VIP 640 may be formed similar to the main wall 110 and left wall 150 of FIG. 2, and folded into place.

Figure 9:
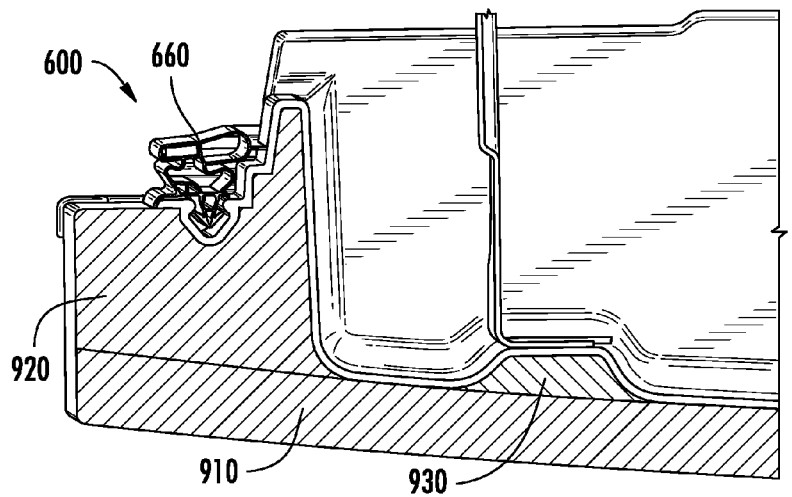
FIG. 9 is a cross sectional view of a refrigerator freezer door having a 3D VIP insulation panel according to another exemplary embodiment.

Turning next to FIG. 9, a flat VIP 910 is provided across the door assembly. 910 is a main wall and 920 is a side wall. The area of the door dyke 650 (FIG. 6) and the gasket assembly 660 are filled by VIP 920 and the area where the bracket meets the inner liner may be filled with a different VIP 930. However, area 930 may be filled with air, PU, EPS, etc., as would be understood by an artisan. This area is referred to by 620 in FIG. 6. In manufacturing the exemplary embodiment of FIG. 9, both VIP 910 and 920 may be formed of sections having an inner and/or outer envelope, or film, which are folded 180° into place, instead of being folded 90° into place, as in FIG. 1.

Figure 10:
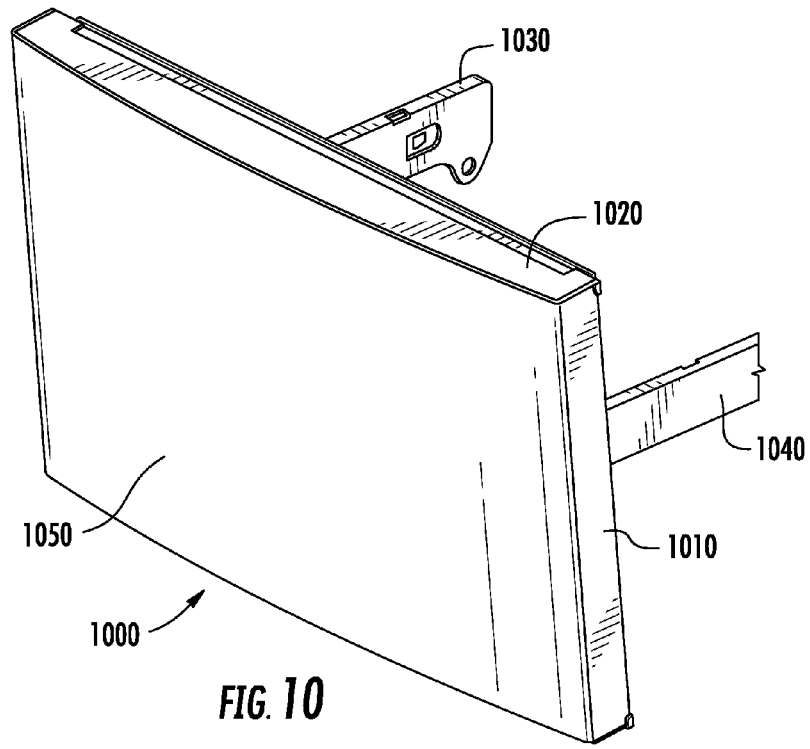
FIG. 10 is a perspective view of a refrigerator freezer door assembly according to an exemplary embodiment.

Turning to FIG. 10, this exemplary embodiment illustrates a perspective view of an assembled refrigerator freezer door assembly 1000. At the outside of the freezer door assembly is a door panel or outer liner 1050. The side edges of the door panel 1050 are labeled as 1010. Also shown in FIG. 10 is a top end cap 1020. A lower end cap is not seen in this figure. In addition, protruding from the back of the door panel 1050 is a pair of mounting brackets. Specifically, left mounting bracket is represented by 1030 and right mounting bracket 1040. The mounting brackets are mounted to the freezer by screws in a manner that would be understood by one of ordinary skill in the art, and will not be described herein.

Figure 11:
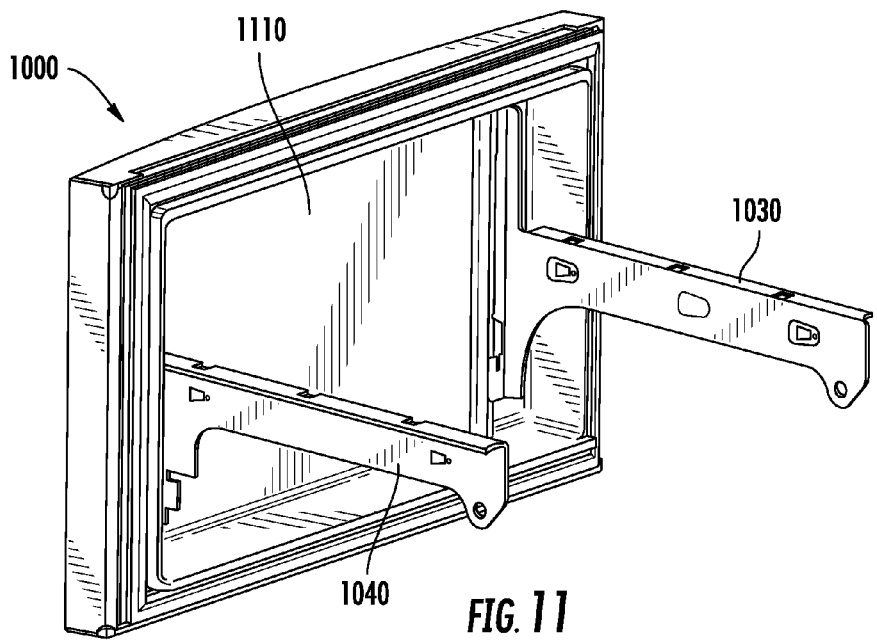
FIG. 11 is a rear perspective view of the refrigerator freezer door assembly of FIG. 10.

FIG. 11 is a rear view of the perspective view of the refrigerator freezer door illustrated in FIG. 10. This figure illustrates a rear surface 1110 of an inner door liner 1270 (FIG. 12), as well as the left and right mounting brackets 1030 and 1040, respectively.

Figure 12:
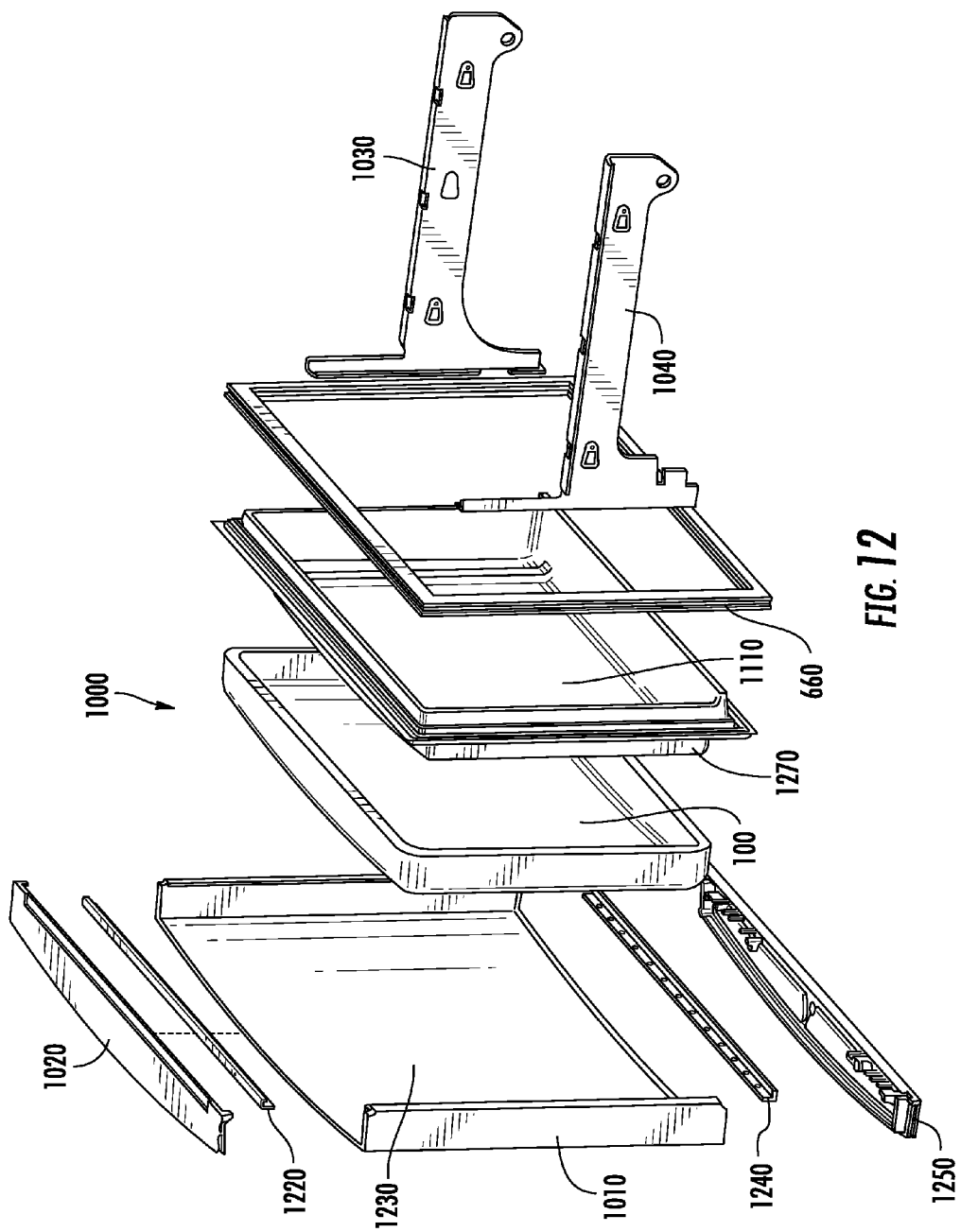
FIG. 12 is an exploded view of the refrigerator freezer door of FIG. 11.

FIG. 12 is an exploded view of the refrigerator freezer door assembly 1000 of FIG. 11. This exemplary embodiment includes a door panel 1050 (FIG. 10) having an inner surface 1230. The side edges of the door panel 1230 are folded inwardly at 1010. Above the door panel is a seal 1220 and a top end cap 1020. At the bottom of the door panel 1050 is a bracket 1240 as well as a bottom end cap 1250. Inside the rear surface 1230 of the door panel assembly is a folded VIP I 100. In this illustration, the VIP may be the same or similar to the VIP insulation panel of FIG. 1C. Inside of the VIP is an inner door liner 1270 having a rear inner surface 1110. On the inside of the inner door liner 1270 is a gasket 660 which surrounds the perimeter of the inner door liner 1270. Mounted to the rear surface 1110 of the inner door liner 1270 is a left mounting bracket 1030 and a right mounting bracket 1040.

Although the above description has described and illustrated various present disclosure, the present disclosure is merely exemplary by nature and is not to be construed as limiting of the inventive concept. Rather, the inventive concept of the disclosed present disclosure is defined by the claimed subject matter.

The invention claimed is:

1. A three-dimensional vacuum insulated panel manufactured from a two-dimensional flat panel of non-uniform thickness, the three-dimensional vacuum insulated panel comprising:
   an outer film;
   a flat vacuum insulated panel main wall on the outer film;
   a vacuum insulated panel top wall on the outer film adjacent to and at an edge of the main wall;
   a vacuum insulated panel bottom wall on the outer film adjacent to the main wall and opposite to the top wall;
   a vacuum insulated panel left wall on the outer film and adjacent to and at an edge of the main wall;
   a vacuum insulated panel right wall on the outer film and adjacent to the main wall and opposite to the left wall, wherein one or more of the vacuum insulated panel top wall, the vacuum insulated panel bottom wall, the vacuum insulated panel left wall and the vacuum insulated panel right wall have a different thickness than the main wall;
   an inner film on top of the main wall and each of the vacuum insulated panel top wall, vacuum insulated panel bottom wall, vacuum insulated panel left wall and vacuum insulated panel right wall; wherein the inner film is longer than the outer film,
   wherein the inner and outer films are sealed, and
   the inner film is configured to be of a length wherein folding the vacuum insulated panel top wall, vacuum insulated panel bottom wall, vacuum insulated panel left wall and vacuum insulated panel right wall onto the main wall produces a three-dimensional vacuum insulated panel of non-uniform thickness.

2. The three-dimensional vacuum insulated panel of claim 1, wherein the folded vacuum insulated panel top wall, vacuum insulated panel bottom wall, vacuum insulated panel left wall and the vacuum insulated panel right wall onto the main wall produce a three-dimensional vacuum insulated panel insulation panel free from tears or micro cracks in a film structure, due to the inner film being longer than the outer film.

3. The three-dimensional vacuum insulated panel of claim 1, wherein the inner film being longer than the outer film results in the inner film being folded without tearing or creating micro cracks in the sealed inner and outer films in response to the vacuum insulated panel top wall, vacuum insulated panel bottom wall, vacuum insulated panel left wall and vacuum insulated panel right wall being folded.

4. The three-dimensional vacuum insulated panel of claim 1, wherein the three-dimensional vacuum insulated panel is configured to fill a door dyke of a refrigerator or freezer.

5. The three-dimensional vacuum insulated panel of claim 1, wherein the top wall has a stepped portion of greater thickness than a remainder of the top wall to fill a door dyke of a refrigerator freezer.

6. The three-dimensional vacuum insulated panel of claim 5, wherein the stepped portion prevents air infiltration to a door gasket.

7. The three-dimensional vacuum insulated panel of claim 1, wherein the vacuum insulated panel right wall has two additional vacuum insulated panel walls adjacent thereto that, in response to being folded, are at right angles with one another and are of greater thickness than the remaining vacuum insulated panel walls.

8. The three-dimensional vacuum insulated panel of claim 7 wherein the two additional vacuum insulated panel walls of greater thickness than the remaining walls are configured to provide extra insulation to a compressor.

9. A method of manufacturing a three-dimensional vacuum insulated panel from a two-dimensional flat panel of non-uniform thickness for a refrigerator, a refrigerator freezer or a non-appliance, the method comprising the steps of:
   providing an outer film;
   providing a flat vacuum insulated panel main wall on the outer film;
   providing a vacuum insulated panel top wall on the outer film adjacent to and at an edge of the main wall;
   providing a vacuum insulated panel bottom wall on the outer film adjacent to the main wall and opposite to the top wall;
   providing a vacuum insulated panel left wall on the outer film and adjacent to and at an edge of the main wall;
   providing a vacuum insulated panel right wall on the outer film and adjacent to the main wall and opposite to the left wall, wherein one or more of the vacuum insulated panel top wall, the vacuum insulated panel bottom wall, the vacuum insulated panel left wall and the vacuum insulated panel right wall are thicker than the main wall;
   providing an inner film on top of the main wall and each of the vacuum insulated panel top wall, vacuum insulated panel bottom wall, vacuum insulated panel left wall and vacuum insulated panel right wall; wherein the inner film is longer than the outer film,
   sealing the inner and outer films, and
   providing the inner film in a length wherein folding the vacuum insulated panel top wall, vacuum insulated panel bottom wall, vacuum insulated panel left wall and vacuum insulated panel right wall onto the main wall produces a three-dimensional vacuum insulated panel of non-uniform thickness.

10. The method of claim 9, wherein the step of folding the vacuum insulated panel top wall, vacuum insulated panel bottom wall, vacuum insulated panel left wall and the vacuum insulated panel right wall onto the main wall to produce a three-dimensional vacuum insulated panel includes preventing tears or micro cracks in a film structure, due to the inner film being longer than the outer film.

11. The method of claim 9, wherein the inner film being longer than the outer film provides stretching of the inner film in response to the vacuum insulated panel top wall, vacuum insulated panel bottom wall, vacuum insulated panel left wall and vacuum insulated panel right wall being folded without tearing or creating micro cracks in the sealed inner and outer films.

12. The method of claim 9, further including the step of providing two additional vacuum insulated panel walls, of greater thickness than the remaining walls, adjacent to the vacuum insulated panel right wall in a manner wherein in response to being folded, the two additional vacuum insulated panel walls are at right angles with one another.

13. The method of claim 12, wherein the two additional vacuum insulated panel walls of greater thickness than the remaining walls are configured to provide extra insulation to a compressor.

14. The method of claim 9, wherein the three-dimensional vacuum insulated panel provides the insulation for a refrigerator or freezer cabinet or a non-appliance.

15. The method of claim 9, wherein the three-dimensional vacuum insulated panel provides the insulation for a refrigerator or freezer door.

16. The method of claim 9, wherein the three-dimensional vacuum insulated panel provides more useable space within a refrigerator freezer.

* * * * *